United States Patent [19]

Sasahara

[11] Patent Number: 4,870,606
[45] Date of Patent: Sep. 26, 1989

[54] TRIGONOMETRIC FUNCTION PREPROCESSING SYSTEM

[75] Inventor: Misayo Sasahara, Tokyo, Japan

[73] Assignee: NEC Corporation, Tokyo, Japan

[21] Appl. No.: 149,333

[22] Filed: Jan. 28, 1988

[30] Foreign Application Priority Data

Jan. 28, 1987 [JP] Japan .................................. 62-19302

[51] Int. Cl.⁴ .............................................. G06F 1/02
[52] U.S. Cl. ..................................... 364/721; 364/729
[58] Field of Search ............... 364/721, 736, 761, 764, 364/729; 328/14

[56] References Cited

U.S. PATENT DOCUMENTS 3,735,110 5/1973 LeComte ............................. 364/729
3,813,528 5/1974 Blanding ............................. 364/729

Primary Examiner—Gary V. Harkcom
Assistant Examiner—Tan V. Mai
Attorney, Agent, or Firm—Foley & Lardner, Schwartz, Jeffery, Schwaab, Mack, Blumenthal & Evans

[57] ABSTRACT

A trigonometric function preprocessing system used for calculating a value of a given trigonometric function of a given numerical data, including a dividend register coupled to store the given numerical data as a dividend; a divisor register coupled store a divisor; and an arithmetic divider having a pair of inputs coupled to the dividend and divisor registers for generating a quotient and a remainder. A quotient register is coupled to store the quotient and first, second and third flags are provided to be coupled to the quotient register so as to store three least significant bits of the quotient. Further, a fourth flag is provided for storing information indicative of a sign of the given numerical data. A first logic circuit is coupled to at least two of the first to fourth flags for determining a sign of an output value of the given trigonometric function. A second logic circuit is coupled to at least two of the first to third flags for selecting one of a sine function and a cosine function to be executed.

8 Claims, 7 Drawing Sheets

TRIGONOMETRIC FUNCTION PREPROCESSING SYSTEM

BACKGROUND OF THE INVENTION

1. Field of the invention

The present invention relates to a trigonometric function preprocessing system.

2. Description of related art

Heretofore, in order to obtain the value of trigonometric functions such as sin X and cos Y, there have been known a variety of algorithms such as series expansions, for example Taylor expansion or Chebyshev expansion, or so-called CORDIC. However, since it is not useful to use these algorithms in a broadly defined area in view of precision and time of operation, it is an ordinary practice to first execute a residue arithmetic operation so that the remainder of X comes under an extent of 0 to $\pi/4$ and then to apply the algorithms to only a narrow extent of $0 < X < \pi/4$.

In brief, a conventional trigonometric function processing system has executed the following steps by means of microprograms. Specifically, in the case of obtaining trigonometric functions such as Y=sin X and Y=cos X, the residue arithmetic operation is carried out by putting X as a dividend and $\pi/4$ as a divisor so that the remainder R fulfils a condition of $0 < R < \pi/4$. Then, three least significant bits of a quotient of the residue arithmetic operation are examined bit by bit so as to sequentially set corresponding three flags. Two values are selected from the three flags thus set and another flag indicative of a sign of a given input X and a sign of the solution Y is determined on the basis of the selected two values. Further, another pair of values are selected from the three flags thus set, and the type of a trigonometric function operation to be executed is selected on the selected pair of values. Thereafter, the selected trigonometric function operation is executed so as to obtain an absolute value of the solution Y, and then, the absolute value thus obtained and the sign of the solution already obtained are combined to give a value of the solution Y.

As seen from the above, since the conventional system processes the above mentioned various steps by means of microprograms, it has required a large number of program steps, particularly for the sequential process for setting the three flags, the sequential process for determining the sign of the solution and the sequential process for selecting the type of trigonometric function operation to be executed. Therefore, the conventional system has needed a long execution time.

SUMMARY OF THE INVENTION

Accordingly, it is an object of the present invention to provide a trigonometric function preprocessing system which has overcome the above mentioned defect of the conventional one.

Another object of the present invention is to provide a trigonometric function preprocessing system capable of obtaining the value of the trigonometric function with a decreased number of program steps and with a reduced execution time.

A further object of the present invention is to provide such a trigonometric function preprocessing system which is capable of obtaining the value of the trigonometric function at a reduced execution time, only with a small number of additional circuit elements.

The above and other objects of the present invention are achieved in accordance with the present invention by a trigonometric function preprocessing system used for calculating a value of a given trigonometric function of a given numerical data comprising a dividend register coupled to store the given numerical data as a dividend; a divisor register coupled store a divisor; an arithmetic divider having a pair of inputs coupled to the dividend and divisor registers for generating a quotient and a remainder; a quotient register coupled to store the quotient; first, second and third flags coupled to the quotient register so as to store the three least significant bits of the quotient; a fourth flag for storing information indicative of a sign of the given numerical data; first logic unit coupled to at least two of the first to fourth flags for determining a sign of an output value of the given trigonometric function; and a second logic unit coupled to at least two of the first to third flags for selecting one of a sine function and a cosine function to be executed.

As seen from the above mentioned arrangement, in a system for calculating a trigonometric function by executing a residue arithmetic operation, the present invention provides a hardware means for setting the three least significant bits of an obtained quotient Q to three corresponding flags. Further, there are provided a logic circuit for determining the sign of the output on the basis of the sign of the input and/or the values of the flags and for selecting the type of the trigonometric function to be executed on the basis of the values of the flags. Therefore, the present invention will make it unnecessary to carry out the setting of the flags, determination of the sign of the output and the type of the trigonometric function to executed. Thus, the system in accordance with the present invention can execute a calculation of a trigonometric function with a decreased number of program steps, and hence at a reduced time of execution.

The above and other objects, features and advantages of the present invention will be apparent from the following description of a preferred embodiment of the invention with reference to the accompanying drawings.

DESCRIPTION OF THE PREFERRED EMBODIMENT

First, description will be made on one example of an algorithm for calculating the trigonometric function "Y=sin X" with reference to FIG. 1. A first step is to execute a residue arithmetic operation by putting X as a dividend and $\pi/4$ as a divisor so that a remainder R and a quotient Q are obtained, respectively. Specifically, $R = X \cdot \mathrm{mod}\ (\pi/4)$. A flag "fc" is set on the basis of the least significant bit of the quotient Q obtained as the result of the residue arithmetic operation, and thereafter, two flags "fb" and "fa" are sequentially set on the next and third least significant bits of the quotient Q, respectively. Specifically, if the least significant bit of the quotient Q is "1", the flag "fc" is set to "1". If the second significant bit is "1", the flag "fb" is set to "1". If the third significant bit is "1", the flag "fa" is set to "1". Moreover, a sign flag SF is set in accordance with the sign of the given number X.

In this situation, the relation between the value and the sign SF of X and the values of flags "fa", "fb", "fc" can be expressed as shown in the following table 1.

TABLE 1

| X | $-2\pi<-1\frac{3\pi}{4}$ | $<-1\frac{\pi}{2}$ | $<-1\frac{\pi}{4}$ | $<-\pi<-$ | $\frac{3\pi}{4}$ | $<-\frac{\pi}{2}$ | $<-\frac{\pi}{4}$ | $<0<\frac{\pi}{4}$ | $<\frac{\pi}{2}$ | $<\frac{3\pi}{4}$ | $<\pi<1\frac{\pi}{4}$ | $<1\frac{\pi}{2}$ | $<1\frac{3\pi}{4}$ | $<2\pi$ |
|---|---|---|---|---|---|---|---|---|---|---|---|---|---|---|
| SF | 1 | 1 | 1 | 1 | 1 | 1 | 1 | 1 0 | 0 | 0 | 0 0 | 0 | 0 | 0 |
| fa | 1 | 1 | 1 | 1 | 0 | 0 | 0 | 0 0 | 0 | 0 | 0 1 | 1 | 1 | 1 |
| fb | 1 | 1 | 0 | 0 | 1 | 1 | 0 | 0 0 | 0 | 1 | 1 0 | 0 | 1 | 1 |
| fc | 1 | 0 | 1 | 0 | 1 | 0 | 1 | 0 0 | 1 | 0 | 1 0 | 1 | 0 | 1 |

Figure 1:
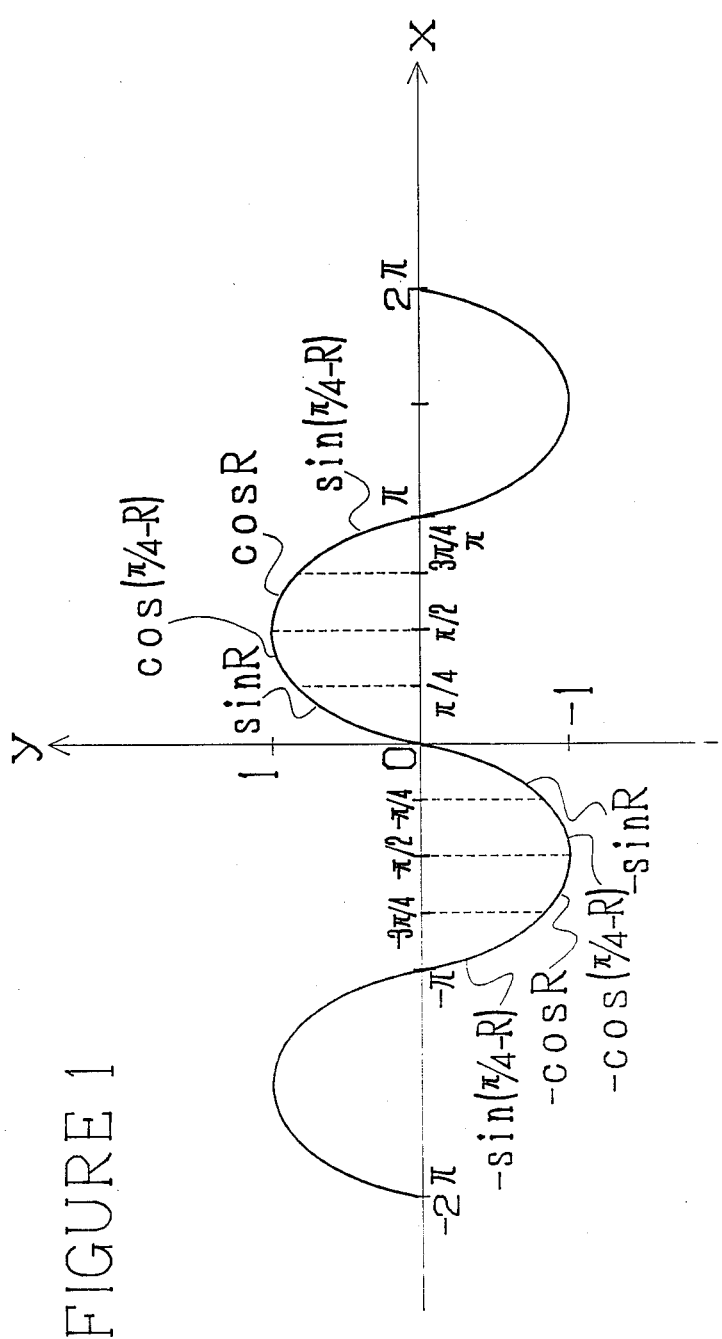
FIG. 1 is a graph showing one example of a trigonometric function "sin X"

As seen from comparison between the above table 1 and FIG. 1, if "fc" is "1", a replacement of $R = \pi/4 - R$ is made. An exclusive-OR between "fb" and "fc" is sought. If fc $\oplus$ fb = "1", "cos R" is calculated. Otherwise, if fc $\oplus$ fb = "0", "sin R" is calculated. The calculation of the trigonometric function is carried out by means of CORDIC or series expansion. As a result, an absolute value $|Y|$ is obtained. On the assumption that SF of "1" indicates that X is negative and SF of "0" shows that X is positive, on the other hand, the sign of Y is determined from an exclusive-OR between the sign SF of X and the flag "fa". Thus, Y=sin X is obtained.

Figure 2:
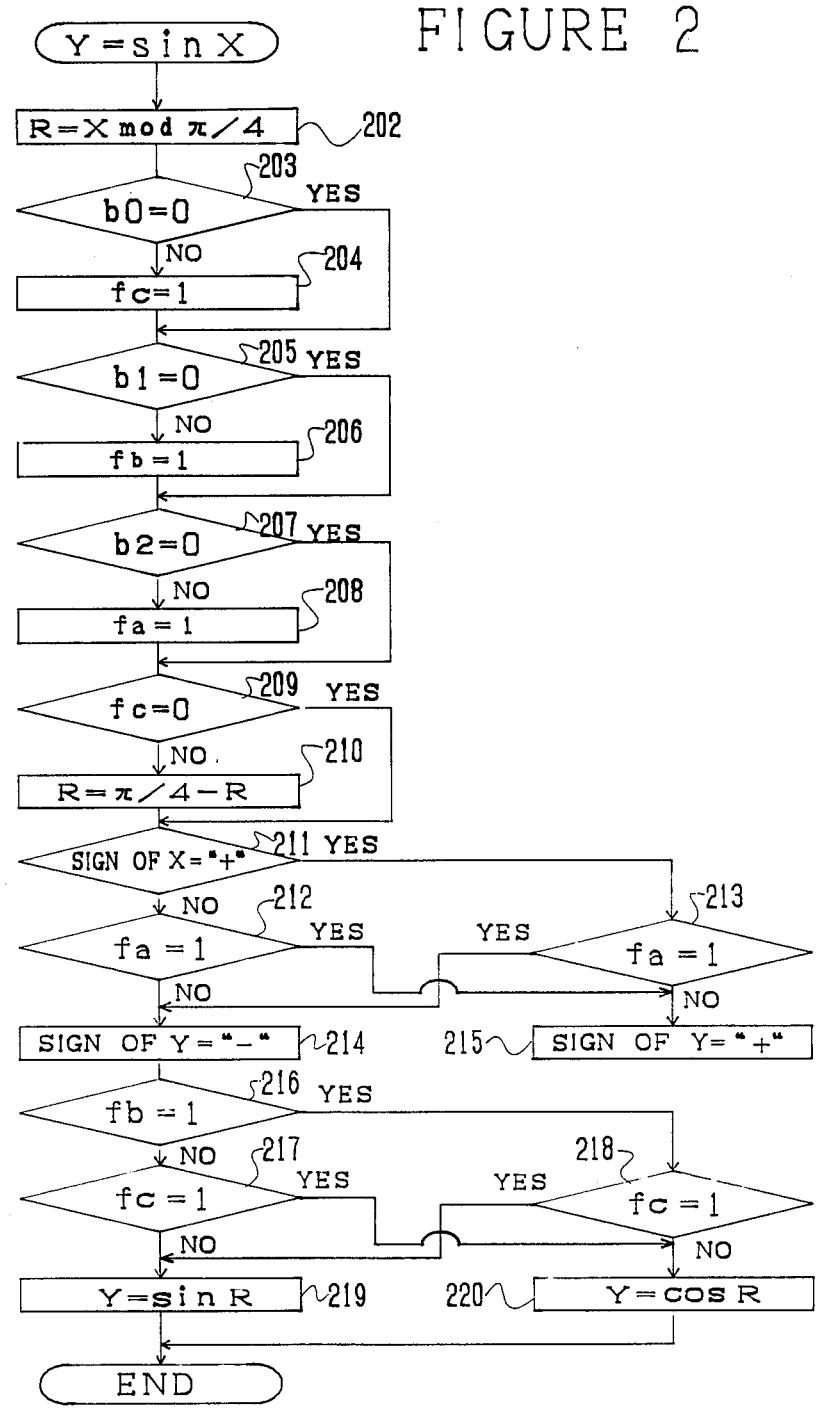
FIG. 2 is a flowchart of an example of a calculation of "sin X" executed in a conventional trigonometric function calculation system.

Next, description will be made on a conventional calculation method of Y=sin X with reference to the flowchart shown in FIG. 2.

In an initialized condition, the flags "fa", "fb" and "fc" are at "0", and then, the flag SF is set in accordance with the sign of X. First, as shown in a step 202, X is divided by $\pi/4$ to seek a remainder "R" and a quotient "Q". Namely, the residue arithmetic operation "$R = X\ \mathrm{mod}\ \pi/4$" is executed, and then, three least significant bits of an obtained quotient "Q" are sequentially examined as shown in steps 203, 205 and 207. If the least significant bit "b0" of the quotient "Q" is "1", the flag "fc" is set to "1" in a step 204. If the next least significant bit "b1" of the quotient "Q" is "1", the flag "fb" is set to "1" in a step 206. Further, if the third least significant bit "b2" of the quotient "Q" is "1", the flag "fa" is set to "1" in a step 208.

Then, in a step 209, a decision is made on whether or not "fc" is "1". If "fc" is "1", the replacement of $R = \pi/4 - R$ is performed in a step 210. Further, the flag SF and "fc" are examined in steps 211, 212 and 213. If the sign flag SF is "0" indicating that the sign of the input X is positive and if "fa" = "1", or if the sign flag SF is "1" indicating that the sign of the input X is negative and if "fa" = "0", the sign of Y is then determined as a minus as indicated in a step 214. Otherwise, the sign of Y is determined as a plus as indicated in a step 215.

Thereafter, "fb" and "fc" are examined in steps 216, 217 and 218. If "fb" = "1" and "fc" = "0", or if "fb" = "0" and "fc" = "1", the trigonometric function "cos R" is derived by using the CORDIC or series expansion. Otherwise, the trigonometric function "sin R" is calculated by using the CORDIC or series expansion. Thus, the result obtained from the calculation is deemed as a solution of sin X.

Next, description will be made on one example of an algorithm for calculating the trigonometric function "Y=cos X" with reference to FIG. 3. A first step is to execute a residue arithmetic operation by putting X as a dividend and $\pi/4$ as a divisor so that a remainder R and a quotient Q are obtained, respectively. Specifically, $R = X \cdot \mathrm{mod}\ (\pi/4)$. Similarly to the case of sin X, a flag "fc" is set on the basis of the least significant bit of the quotient Q obtained as the result of the residue arithmetic operation, and thereafter, two flags "fb" and "fa" are sequentially set on next and third least significant bits of the quotient Q, respectively.

In this situation, the relation between the value and the sign SF of X and the values of flags "fa", "fb, "fc" can be expressed as shown in the following table 2.

TABLE 2

| X | $-2\pi<-1\frac{3\pi}{4}$ | $<-1\frac{\pi}{2}$ | $<-1\frac{\pi}{4}$ | $<-\pi<-$ | $\frac{3\pi}{4}$ | $<-\frac{\pi}{2}$ | $<-\frac{\pi}{4}$ | $<0<\frac{\pi}{4}$ | $<\frac{\pi}{2}$ | $<\frac{3\pi}{4}$ | $<\pi<1\frac{\pi}{4}$ | $<1\frac{\pi}{2}$ | $<1\frac{3\pi}{4}$ | $<2\pi$ |
|---|---|---|---|---|---|---|---|---|---|---|---|---|---|---|
| SF | 1 | 1 | 1 | 1 | 1 | 1 | 1 | 1 0 | 0 | 0 | 0 0 | 0 | 0 | 0 |
| fa | 1 | 1 | 1 | 1 | 0 | 0 | 0 | 0 0 | 0 | 0 | 1 1 | 1 | 1 | 1 |
| fb | 1 | 1 | 0 | 0 | 1 | 1 | 0 | 0 0 | 0 | 1 | 1 0 | 0 | 1 | 1 |
| fc | 1 | 0 | 1 | 0 | 1 | 0 | 1 | 0 0 | 1 | 0 | 1 0 | 1 | 0 | 1 |

Figure 3:
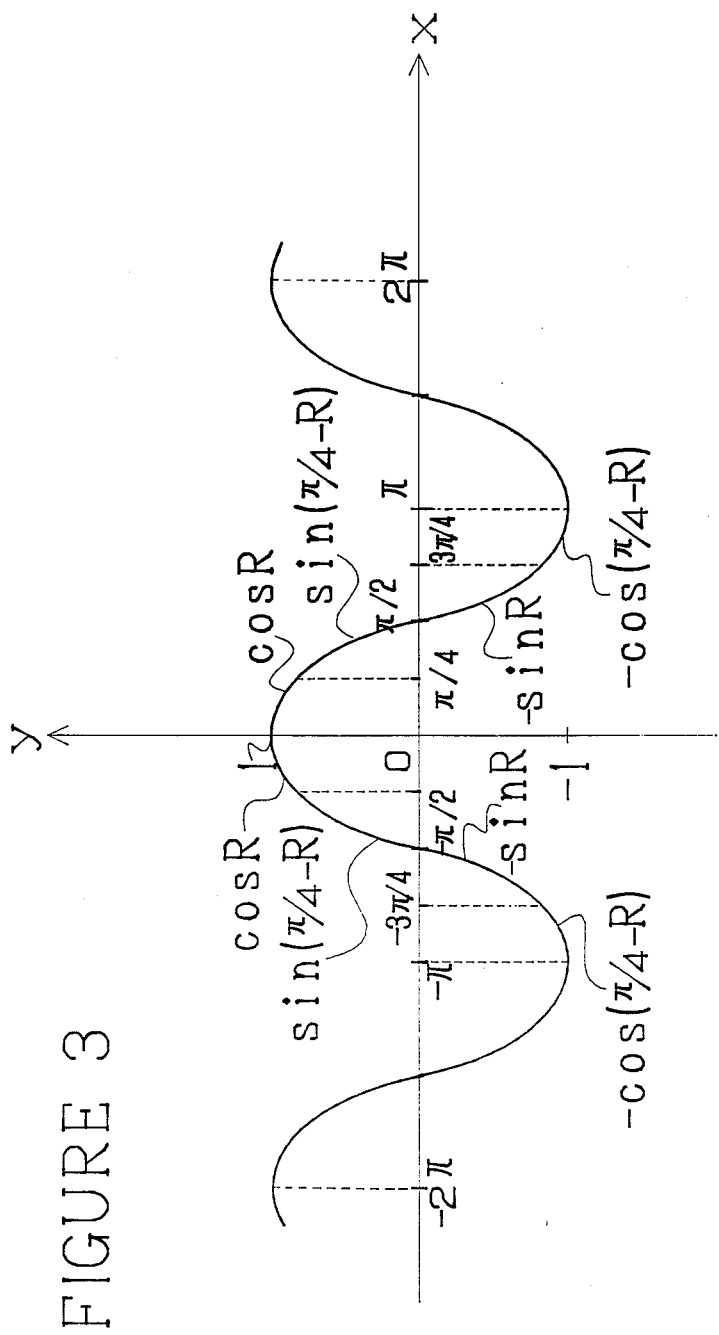
FIG. 3 is a graph showing one example of a trigonometric function "cos X"

As seen from comparison between the above table 2 and FIG. 3, if "fc" is "1", a replacement of $R = \pi/4 - R$ is made. An exclusive-OR between "fb" and "fc" is sought. If fc $\oplus$ fb = "0", cos R is calculated. Otherwise, if fc $\oplus$ fb = "1", sin R is calculated. The calculation of the trigonometric function is carried out by means of CORDIC or series expansion. As a result, an absolute value $|Y|$ is obtained. On the other hand, the sign of Y is determined from an exclusive-OR between the flags "fa" and "fb". Thus, Y=cos X is obtained.

Figure 4:
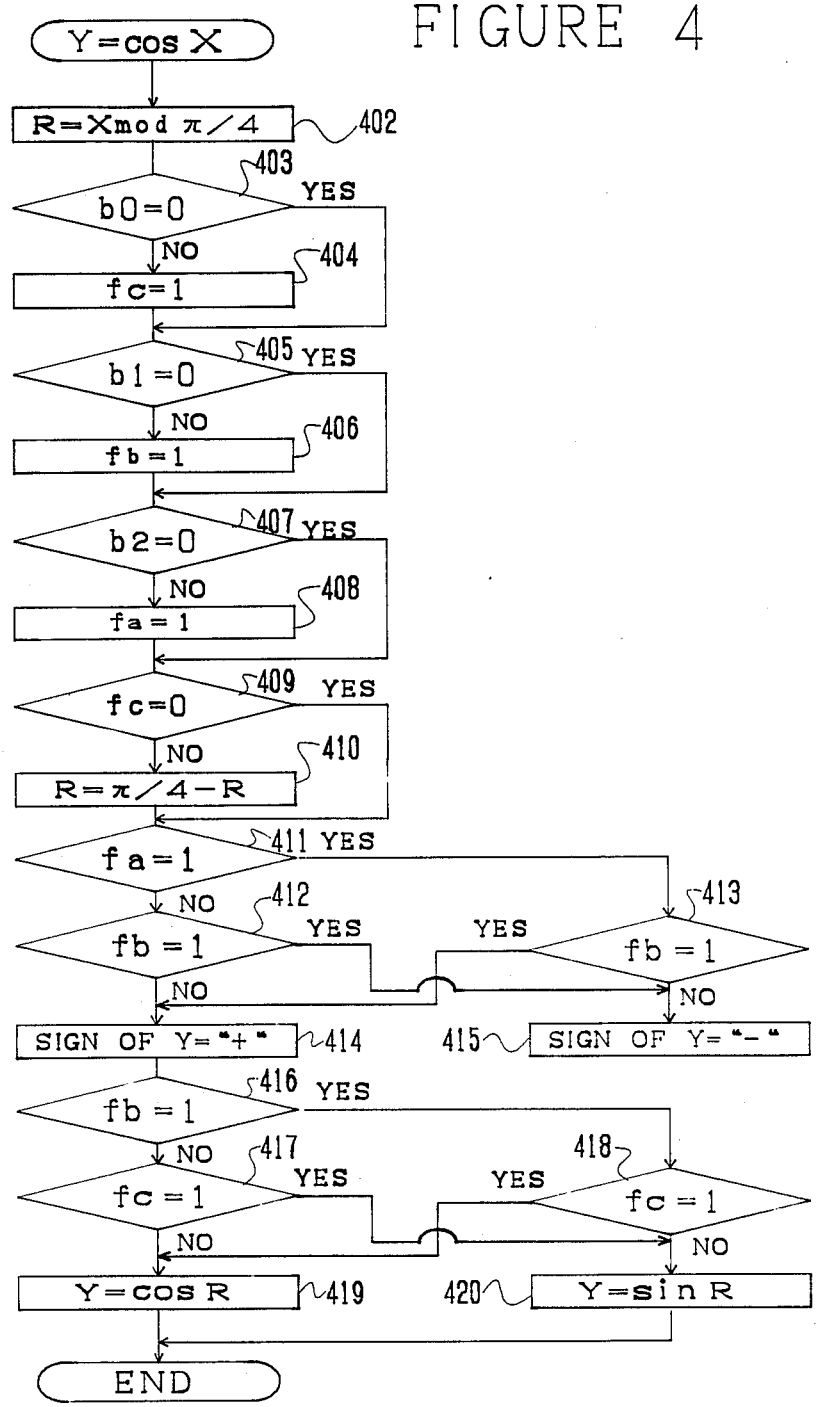
FIG. 4 is a flowchart of an example of a calculation of "cos X" executed in a conventional trigonometric function calculation system.

Then, description will be made on a conventional calculation method of Y=cos X with reference with a flowchart shown in FIG. 4.

In an initialized condition, the flags "fa", "fb" and "fc" are at "0. First, as shown in a step 402, X is divided by $\pi/4$ to seek a remainder "R" and a quotient "Q".

Specifically, the residue arithmetic operation "$R=X$ mod $\pi/4$ is executed, and then, the three least significant bits of an obtained quotient "Q" are sequentially examined as shown in steps 403, 405 and 407. If the least significant bit "b0" of the quotient "Q" is "1", the flag "fc" is set to "1" in a step 404. If the next least significant bit "b1" of the quotient "Q" is "1", the flag "fb" is set to "1" in a step 406. Further, if the third least significant bit "b2" of the quotient "Q" is "1", the flag "fa" is set to "1" in a step 408.

Then, in a step 409, a decision is made as to whether or not "fc" is "1". If "fc" is "1", the replacement of $R=\pi/4-R$ is performed in a step 410. Further, the flag "fa" and "fb" are examined in steps 411, 412 and 413. If "fa"="1" and "fb"="1", or if "fa"="0" and "fb"="0", the sign of Y is then determined as a plus as indicated in a step 414. Otherwise, the sign of Y is determined as a minus as indicated in a step 415.

Thereafter, "fb" and "fc" are examined in steps 416, 417 and 418. If "fb"="1" and "fc"="0", or if "fb"32 "0" and "fc"="1", the trigonometric function "sin R " is calculated by using the CORDIC or series expansion. Otherwise, the trigonometric function "cos R " is calculated by using the CORDIC or series expansion. Thus, the result obtained from the calculation is deemed as a solution of cos X.

As seen from the above mentioned description, the conventional system for calculating the trigonometric function will need a large number of program steps, since the flags "fa", "fb" and "fc" are set in the course of a programmed process, while examining the three least significant bits of the quotient of the residue arithmetic operation "$R=X$ mod$\pi/4$, and since the sign of the output and the type of trigonometric function to be executed are determined in the course of a programmed process. Therefore, the conventional method inevitably requires a long execution time.

Figure 5:
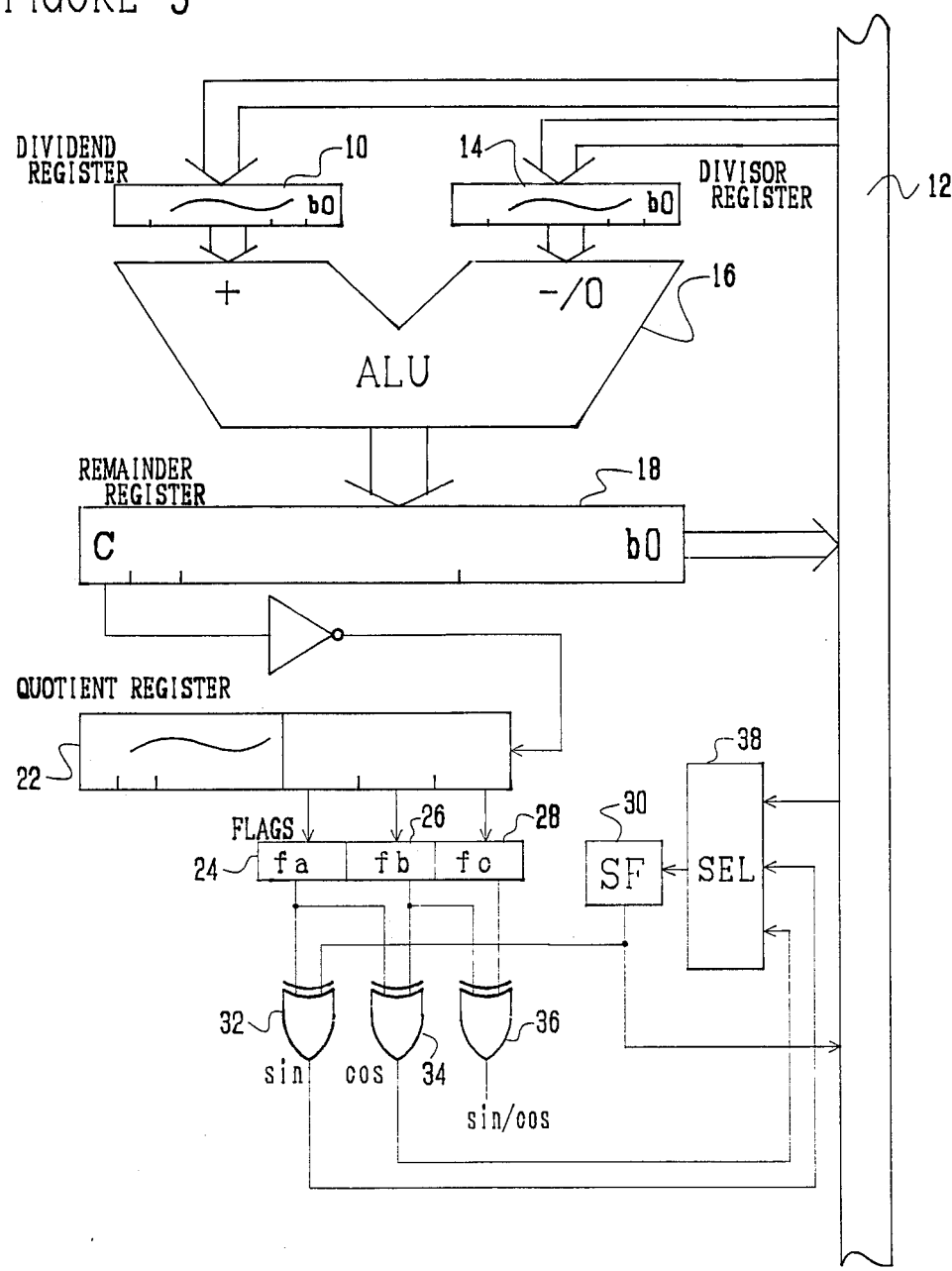
FIG. 5 is a block diagram of one embodiment of the trigonometric function preprocessing system in accordance with the present invention.

Referring to FIG. 5, there is shown a block diagram of one embodiment of the trigonometric function preprocessing system in accordance with the present invention. The shown system comprises a dividend register 10 coupled to an internal bus 12 to receive a dividend X through the bus 12, and divisor register 14 coupled to the bus 12 to receive a divisor, for example $\pi/4$. These registers 10 and 14 are coupled to a pair of inputs of an adder-subtracter 16 composed of for example an arithmetic and logic unit (called "ALU" hereinafter). An output of the ALU 16 is coupled to a remainder register 18, which is in turn coupled to the bus 12 so as to feed back a remainder to the dividend register 10 for cyclic operation of subtraction. In addition, the most significant bit of the remainder register 18 is connected through an invertor 20 to a quotient register 22. Three least significant bits of the quotient registers 22 are coupled to three flags "fa", "fb" and "fc", 24, 26 and 28, respectively. Further, another flag "SF" 30 is provided for hold the information indicative of the sign of an input data X of an output data Y.

Moreover, there are provided three exclusive-OR gates 32, 34 and 36. The exclusive-OR gate 32 is connected to receive outputs of the flag "fa" 24 and the flag "SF" 30 and has an output connected to a selector 38. The exclusive-OR gate 34 is connected to receive outputs of the flag "fa" 24 and the flag "fb" 26 and has the output connected to a selector 38. The exclusive-OR gate 36 is connected to receive outputs of the flag "fb" 26 and the flag "fc" 28. The selector 38 is adapted to respond the outputs of the exclusive-OR gates so as to select the type of the trigonometric function to be calculated.

Figure 6:
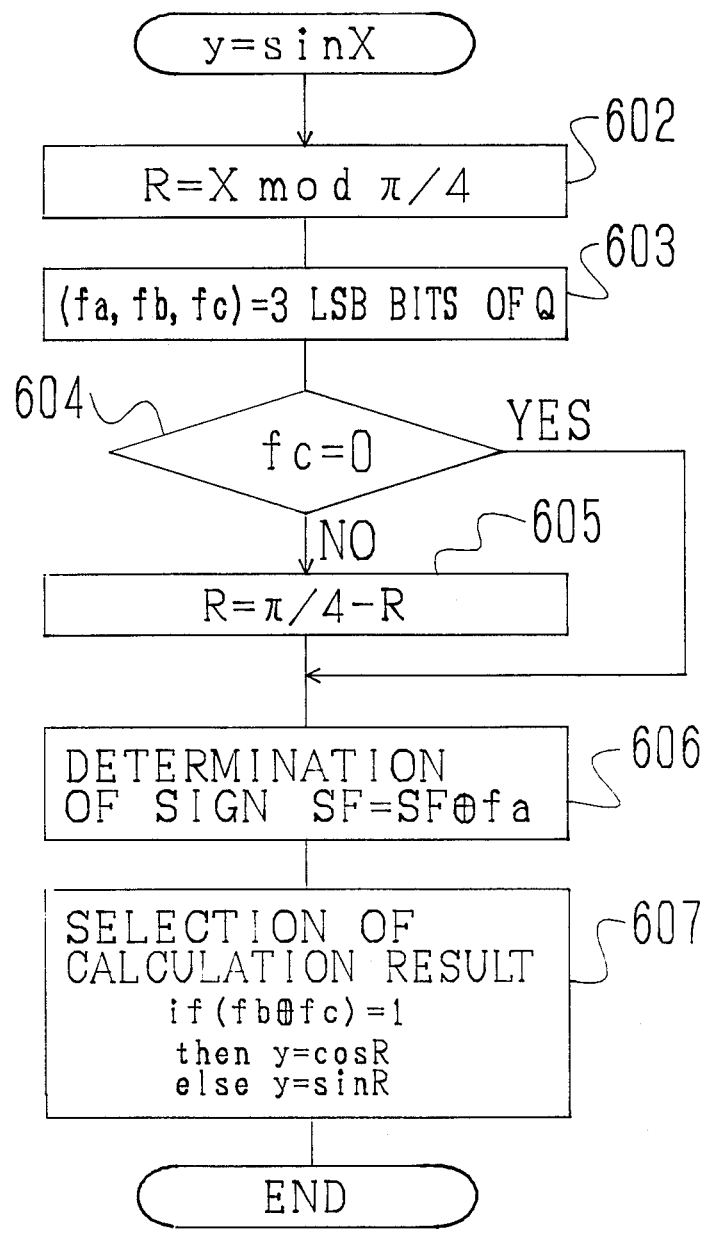
FIG. 6 is a flowchart of an example of a calculation of "sin X" executed in the trigonometric function calculation system shown in FIG. 5.

Turning to FIG. 6, there is shown a flowchart of a calculation example of "sin X " executed in the trigonometric function calculation system shown in FIG. 5.

First, the dividend X is stored in the dividend register 10, and the divisor $\pi/4$ is set to the divisor register 14. A residue arithmetic operation of $R=X \cdot mod\ (\pi/4)$ is executed by the ALU 16 in a step 602, so that a remainder R and a quotient Q are stored in the remainder register 18 and the quotient register 22, respectively. In a next step 603, the three flags "fa", "fb" and "fc", 24, 26 and 28, are set by the three least significant bits of the quotient Q stored in the register 22, respectively.

Then, examination is made as to whether or not the flag "fc" is "1" in a step 604. If "fc" is "1", $\pi/4-R$ is set in the remainder register 18 in place of R in a step 605. An exclusive-OR between "fa" and "SF" is sought by the exclusive-OR gate 32. Specifically, the output of the exclusive-OR gate 32 determines the sign of the output Y. In response to the output of the exclusive-OR gate 32, the selector 38 will set the sign flag SF so that it indicates the sign of the output Y.

Thereafter, in a further step 407, the exclusive-OR between "fb" and "fc" is obtained by the exclusive-OR gate 36. If $fc+fb="1"$, the selector 38 instructs to cause "cos R" to be calculated. Otherwise, the selector 38 instructs to cause "sin R" to be calculated. Thereafter, the calculation of the selected trigonometric function is carried out in a known manner by means of CORDIC or series expansion.

Figure 7:
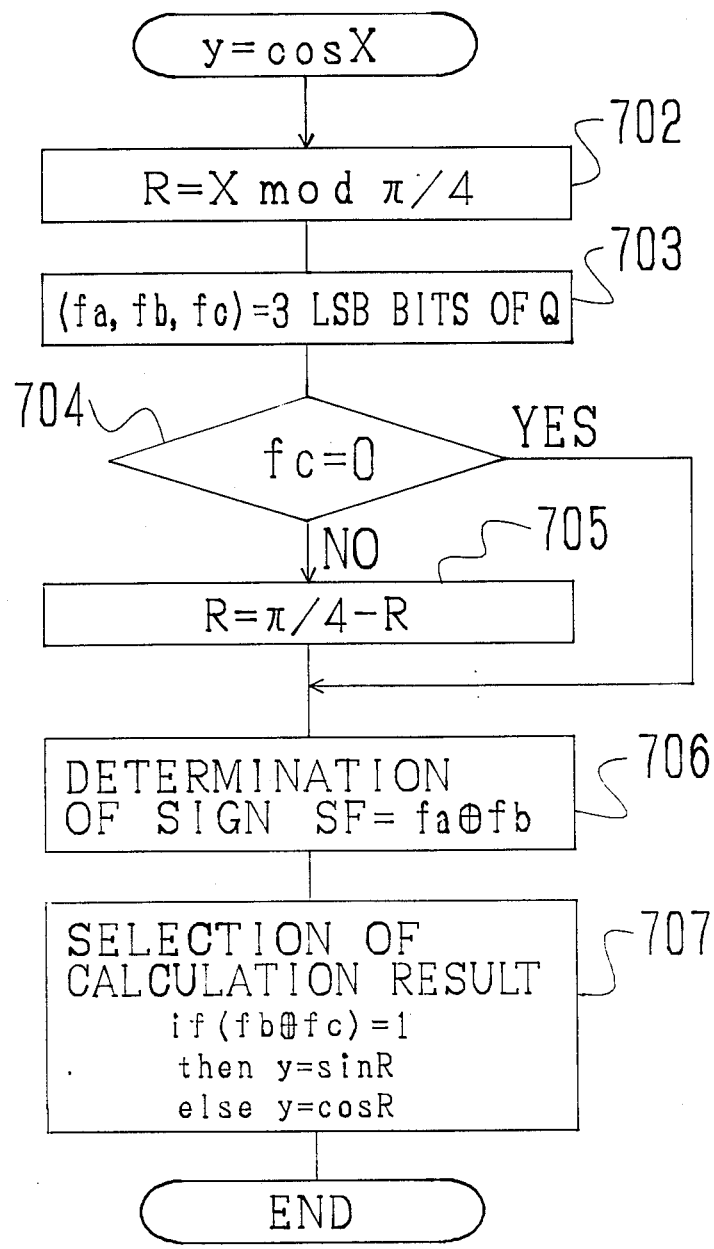
FIG. 7 is a flowchart of an example of a calculation of "cos X" executed in the trigonometric function calculation system shown in FIG. 5.

Next, description will be made on a calculation example of "cos X " with reference to shown in FIG. 7.

First, the dividend X is stored in the dividend register 10, and the divisor $\pi/4$ is set to the divisor register 14. A residue arithmetic operation of $R=X \cdot mod\ (\pi/4)$ is executed by the ALU 16 in a step 702, so that a remainder R and a quotient Q are stored in the remainder register 18 and the quotient register 22, respectively. In a next step 703, the three flags "fa", "fb" and "fc", 24, 26 and 28, are set by the three least significant bits of the quotient Q stored in the register 22, respectively.

Then, examination is made as to whether or not the flag "fc" is "1" in a step 704. If "fc" is "1", the remainder register 18 is set as $R=\pi/4-R$ in a step 705. An exclusive-OR between "fa" and "fb" is sought by the exclusive-OR gate 34. Specifically, the output of the exclusive-OR gate 34 determines the sign of the output Y. In response to the output of the exclusive-OR gate 34, the selector 38 will set the sign flag SF so that it indicates the sign of the output Y.

Thereafter, in a further step 407, the exclusive-OR between "fb" and "fc" is outputted from the exclusive-OR gate 36. If $fc+fb="0"$, the selector 38 instructs to cause "cos R" to be calculated. Otherwise, the selector 38 instructs to cause "sin R" to be calculated. The calculation of the selected trigonometric function is carried out in known manner by means of CORDIC or series expansion.

As seen from the above mentioned description, in a system for calculating a trigonometric function such as sin X and cos Y by executing a residue arithmetic operation putting X as a dividend and $\pi/4$ as a divisor so that a remainder R becomes larger than "0" but less than "$\pi/4$", the embodiments of the present invention provide a hardware means for setting three least significant bits of the obtained quotient Q to three corresponding flags. Further, the above mentioned embodiments provide a logic circuit means for determining the sign of the output Y on the basis of the sign of the input X and/or the values of the flags and for selecting the type of the trigonometric function to executed on the basis of the values of the flags. Therefore, the embodiments will not require the steps 203 to 208, 211 to 213, 216 to 218, 403 to 408, 411 to 413 and 416 to 418 which are executed by microprograms in the conventional system. Thus, the embodiments can execute a calculation of a trigonometric function with a decreased number of program steps, and hence at a reduced time of execution.

The invention has thus been shown and described with reference to the specific embodiments. However, it should be noted that the present invention is in no way limited to the details of the illustrated structures but changes and modifications may be made within the scope of the appended claims.

I claim:

1. A trigonometric function preprocessing system for calculating a value of a given trigonometric function of a given numerical data, comprising:
    a dividend register for storing the given numerical data as a dividend;
    a divisor register for storing a divisor;
    arithmetic dividing means having a pair of inputs coupled to the dividend and divisor registers for generating a quotient and a remainder;
    a quotient register for storing the quotient;
    first, second and third flags coupled to the quotient register so as to store three least significant bits of the quotient;
    a fourth flag for storing information indicative of a sign of the given numerical data;
    first logic means coupled to at least two of the first through fourth flags for determining a sign of an output value of the given trigonometric function; and
    second logic means coupled to at least two of the first through third flags for selecting one of a sine function and a cosine function to be executed.

2. A trigonometric function preprocessing system as claimed in claim 1, wherein the arithmetic dividing means includes an adder-subtracter having a pair of inputs coupled to the dividend and divisor registers, and a remainder register connected to an output of the adder-subtracter having the most significant bit coupled to the quotient register, so that the most significant bit of the remainder register is sequentially inputted to the quotient register and shifted through the quotient register, with the result that the quotient is stored in the quotient register.

3. A trigonometric function preprocessing system as claimed in claim 2, wherein the first flag is directly coupled to the least significant bits of the quotient register, the second flag is directly coupled to the second significant bits of the quotient register, and the third flag is directly coupled to the third significant bits of the quotient register.

4. A trigonometric function preprocessing system as claimed in claim 3, wherein the first logic means includes a first exclusive-OR gate having a pair of inputs directly connected to the third and fourth flags, respectively.

5. A trigonometric function preprocessing system as claimed in claim 4, wherein the second logic means includes a second exclusive-OR gate having a pair of inputs directly connected to the first and second flags, respectively.

6. A trigonometric function preprocessing system as claimed in claim 3, wherein the first logic means includes a first exclusive-OR gate having a pair of inputs directly connected to the second and third flags, respectively.

7. A trigonometric function preprocessing system as claimed in claim 6, wherein the second logic means includes a second exclusive-OR gate having a pair of inputs directly connected to the first and second flags, respectively.

8. A trigonometric function preprocessing system as claimed in claim 3, wherein the first and second logic means include a first exclusive-OR gate having a pair of inputs directly connected to the third and fourth flags, respectively; a second exclusive-OR gate having a pair of inputs directly connected to the second and third flags, respectively; and a third exclusive-OR gate having a pair of inputs directly connected to the first and second flags, respectively.

* * * * *